US010928635B1

(12) United States Patent
Trail et al.

(10) Patent No.: US 10,928,635 B1
(45) Date of Patent: Feb. 23, 2021

(54) CURVED DISPLAY ASSEMBLY FOR ARTIFICIAL REALITY HEADSET

(71) Applicant: Facebook Technologies, LLC, Menlo Park, CA (US)

(72) Inventors: Nicholas Daniel Trail, Bothell, WA (US); Andrew John Ouderkirk, Redmond, WA (US); Pasi Saarikko, Kirkland, WA (US); Sharvil Shailesh Talati, Seattle, WA (US); Hee Yoon Lee, Kirkland, WA (US); Behnam Bastani, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/379,703

(22) Filed: Apr. 9, 2019

(51) Int. Cl.
| G09G 5/02 | (2006.01) |
| G02B 27/01 | (2006.01) |
| G02B 27/00 | (2006.01) |
| F21V 8/00 | (2006.01) |
| G06F 3/01 | (2006.01) |
| G09G 5/10 | (2006.01) |

(52) U.S. Cl.
CPC ......... G02B 27/0172 (2013.01); G02B 6/005 (2013.01); G02B 6/0023 (2013.01); G02B 27/0093 (2013.01); G06F 3/013 (2013.01); G09G 5/10 (2013.01); G02B 2027/011 (2013.01); G02B 2027/014 (2013.01); G02B 2027/0123 (2013.01); G02B 2027/0138 (2013.01); G02B 2027/0178 (2013.01)

(58) Field of Classification Search
CPC .... G09G 5/02; G09G 5/06; G09G 2320/0666; G09G 2340/06; G06T 11/001

USPC ......................................................... 345/589
See application file for complete search history.

(56) References Cited

U.S. PATENT DOCUMENTS

| 10,775,626 | B1 | 9/2020 | Stratton et al. | |
| 2002/0181115 | A1 | 12/2002 | Massof et al. | |
| 2006/0066730 | A1* | 3/2006 | Evans, Jr. ............ | H04N 5/2624 348/218.1 |
| 2015/0309312 | A1* | 10/2015 | Alton .................... | G06T 19/006 345/592 |
| 2016/0018645 | A1* | 1/2016 | Haddick .............. | G09G 3/3208 345/8 |
| 2016/0370855 | A1 | 12/2016 | Lanier et al. | |

(Continued)

OTHER PUBLICATIONS

United States Office Action, U.S. Appl. No. 16/360,911, dated Jul. 24, 2020, 10 pages.

(Continued)

*Primary Examiner* — Gordon G Liu
(74) *Attorney, Agent, or Firm* — Fenwick & West LLP

(57) ABSTRACT

A headset includes a display assembly. The display assembly has a primary portion and a peripheral portion. The primary portion of the display assembly is configured to emit a first portion of image light, and has a first field of view (FOV). The peripheral portion of the display assembly is configured to emit a second portion of the image light over a second FOV, and the peripheral portion is canted relative to the primary portion. The emitted first portion of image light and the emitted second portion of image light create a composite FOV from the perspective of an eyebox, and a seam between the first FOV and the second FOV is located in a peripheral region of the composite FOV.

19 Claims, 7 Drawing Sheets

(56) References Cited

U.S. PATENT DOCUMENTS

| | | | |
|---|---|---|---|
| 2017/0115489 A1* | 4/2017 | Hu | G06T 3/0093 |
| 2017/0357089 A1 | 12/2017 | Tervo et al. | |
| 2017/0371162 A1 | 12/2017 | Makino | |
| 2019/0285905 A1* | 9/2019 | Tam | G02B 17/004 |

OTHER PUBLICATIONS

United States Office Action, U.S. Appl. No. 16/360,911, dated Sep. 17, 2020, 10 pages.

\* cited by examiner

CURVED DISPLAY ASSEMBLY FOR ARTIFICIAL REALITY HEADSET

BACKGROUND

The present disclosure generally relates to headsets, and specifically relates to a curved display assembly for artificial reality headsets.

Near-eye displays (NEDs) are used to display various media to users. NEDs are designed to show users realistic media displays, such that the media covers the field of view of a user. NEDs in virtual reality (VR) systems and/or augmented reality (AR) systems may be required to be compact and light weight, and to provide large exit pupil with a wide field-of-vision for ease of use. However, designing a NED with a wide field-of-view can result in rather large lenses, and a relatively bulky and heavy NED, which can make is unsuitable for AR/VR applications.

SUMMARY

Described herein are embodiments that relate to a curved display assembly (display assembly) for use in artificial reality headsets. A headset includes at least one display assembly (e.g., a display assembly for each eye). The display assembly has a primary portion and a peripheral portion. The primary portion of the display assembly is configured to emit a first portion of image light over a first field of view (FOV). The peripheral portion of the display assembly is configured to emit a second portion of the image light over a second FOV, and the peripheral portion is canted relative to the primary portion. The emitted first portion of image light and the emitted second portion of image light create a composite FOV from the perspective of an eyebox. And a seam between the first FOV and the second FOV is located in a peripheral region of the composite FOV.

Figure 1A:
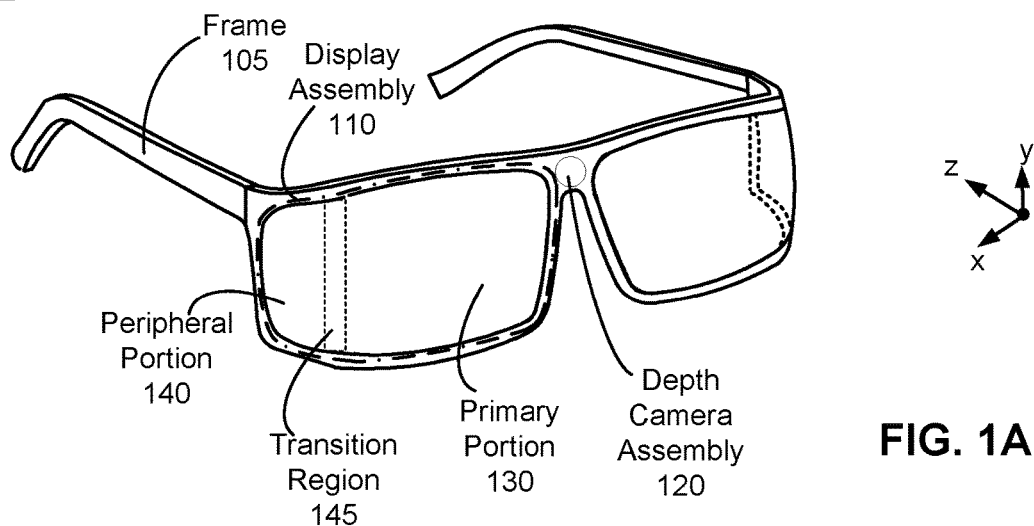
FIG. 1A is a diagram of a headset, in accordance with one or more embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Embodiments described here relate to a curved display assembly for use in artificial reality headsets. A headset includes at least one curved display assembly (referred to as a display assembly). For example, the headset may include a display assembly for each eye. A display assembly generates image light and presents the image light a corresponding eyebox of the headset. As described in detail below the display assembly may be a waveguide display, an electronic display, a reflector display, or some combination thereof. The display assembly includes a primary portion and a peripheral portion that are joined together in a transition region. The transition region is a location where the display assembly has a radius of curvature or overlap that is greater than a threshold value. Accordingly, the primary portion and the peripheral portion are canted relative to each other based in part on an amount of curvature imparted in the transition region.

The primary portion of the display assembly is configured to emit a first portion of image light over a first field of view (FOV). The peripheral portion of the display assembly is configured to emit a second portion of the image light over a second FOV. The peripheral portion is canted relative to the primary portion. The emitted first portion of image light (i.e., over the first FOV) and the emitted second portion of image light (i.e., over the second FOV) create a composite FOV from a perspective of an eyebox of the headset. A seam between the first FOV and the second FOV is located in a peripheral region of the composite FOV. The seam corresponds to a portion of a transition region of the display assembly where the primary portion of the display assembly and the peripheral portion of the display assembly meet, and the transition region has a radius of curvature.

The primary portion of the display assembly is positioned such that the first FOV generally corresponds to gaze locations in front of a user (e.g., user is looking straight ahead). The first FOV includes a central region in front of a user which is likely to include a gaze location (i.e., a foveal FOV of the eye) of the user. Note that the first FOV may be larger than the central region.

The peripheral portion of the display assembly is positioned such that the second FOV is at least a threshold distance from the central region. For example, the second FOV may correspond to the eye looking towards a temple of the user (i.e., to a user's right or left). The first FOV and the second FOV create a composite FOV from the perspective of an eyebox. Accordingly, the composite FOV can generally be broken into the central region and a peripheral region. The central region corresponds to gaze locations generally in front of a user, and the peripheral region generally corresponds to locations outside of the central region. In some embodiments, the first FOV and the second FOV overlap. For example, the first FOV may be in the range of −30 to +30 degrees, and the second FOV may be in the range of 20 to 60 degrees.

A seam between the first FOV and the second FOV is located in the peripheral region of the composite FOV. For example, the seam may be located at least 35 degrees off center, where center is a location that corresponds to a gaze location of an eye of a user of the headset who is looking substantially straight ahead. In some embodiments, center is a central point of the center region. Note that placing the seam in the peripheral region of the composite FOV mitigates chances of the user seeing it as it would generally be outside a foveal region of user's gaze. Moreover, as described in detail below various techniques may also be used to further mitigate visibility of the seam. For a peripheral overlap region, blending may be used to reduce risk of any additional spatial distortion.

Various embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD or near-eye display (NED) connected to a host computer system, a standalone HMD, a standalone NED, a mobile device or computing system, or any other hardware platform capable of providing artificial reality content to one or more viewers.

FIG. 1A is a diagram of a headset 100, in accordance with one or more embodiments. In the illustrated embodiment, the headset 100 is a NED. Note in embodiments not shown the headset 100 may be a head-mounted display (HMD) or some other display that is coupled to a head of the user. The headset 100 presents content to a user. Examples of content presented by the headset 100 include one or more images (e.g., image light), video (e.g., image light), audio, or some combination thereof. In some embodiments, audio is presented via an external device (e.g., speakers and/or headphones) that receives audio information from the headset 100, a console (not shown), or both, and presents audio data based on the audio information. The headset 100 is configured to operate as an artificial reality headset. For example, the headset 100 may operate as a VR headset, an AR headset, a MR headset, or some combination thereof.

The headset 100 shown in FIG. 1A includes a frame 105, a display assembly 110, and optionally includes one or more depth camera assemblies (DCAs) 120. The frame 105 is coupled to one or more optical elements which together display media to users. In some embodiments, the frame 105 may represent a frame of eye-wear glasses.

The display assembly 110 is configured to present content to a user. The display assembly 110 includes a waveguide display. The waveguide display includes a primary portion 130 and a peripheral portion 140 that are joined together in a transition region 145. Accordingly, the primary portion 130 and the peripheral portion 140 are canted relative to each other based in part on an amount of curvature imparted in the transition region 145. The primary portion 130 and the peripheral portion 140 of the display assembly 110 are positions such that their respective FOVs are joined together to create a composite FOV from the perspective of an eyebox of the headset 100.

The primary portion 130 of the display assembly 110 presents a portion of the image light over a first FOV (also referred to as a primary FOV). The primary portion 130 of the display assembly 110 is positioned such that the first FOV generally corresponds to gaze locations in front of a user (e.g., user is looking straight ahead). The first FOV includes a central region in front of a user which is likely to include a gaze location (i.e., a foveal FOV of the eye) of the user. Note that the first FOV may be larger than the central region. In some embodiments, the primary portion 130 of the display assembly 110 is flat. In other embodiments, the primary portion 130 of the display assembly 110 may be curved in one or two dimensions.

The peripheral portion 140 of the display assembly 110 presents a portion of the image light over a second FOV (also referred to as a peripheral FOV). The peripheral portion 140 of the display assembly 110 is positioned such that the second FOV is at least a threshold distance from the central region. For example, the second FOV may correspond to the eye looking towards a temple of the user (i.e., to a user's right or left). In some embodiments, the second portion 140 of the display assembly 110 is flat. In other embodiments, the second portion 140 of the display assembly 110 may be curved in one or two dimensions.

The first FOV and the second FOV create a composite FOV from the perspective of an eyebox. Accordingly, the composite FOV can generally be broken into the central region and a peripheral region. The central region corresponds to gaze locations generally in front of a user, and the peripheral region generally corresponds to locations outside of the central region.

Note that the transition region 145 can cause a seam to appear in the composite FOV. The seam is an area of the image light that includes optical error caused by curvature in the waveguide, or a transition from one display to another. The seam corresponds to a portion of the transition region 145 where the primary portion 130 of the display assembly 110 and the peripheral portion 140 of the display assembly 110 meet, and the transition region 145 has a radius of curvature. The transition region 145 is positioned such that, the seam between the first FOV and the second FOV is located in the peripheral region of the composite FOV. For example, the seam may be located at least 35 degrees off center. In some embodiments, center is a direction that corresponds to a gaze direction of an eye of a user of the headset looking straight ahead. Note that locating the transition region 145 such that the seam is located in the peripheral region of the composite FOV mitigates chances of a user seeing it (as it would generally be outside a foveal region of user's gaze). The display assembly 110 is discussed in detail below with regard to FIGS. 1B-6.

In some embodiments (e.g., AR and/or MR), some or all of the display assembly 110 is at least partially transparent to visible light. In these embodiments, light from a local area in front of the headset 100 may pass through one or both of the primary portion 130 and the peripheral portion 140 of the display assembly 110 to an eye of the user.

The DCA 120 determines depth information for objects in a local area around the headset 100. The DCA 120 is discussed in detail below with regard to FIGS. 2 and 8. Note that while the DCA 120 is shown in a particular location on the headset 100, in other embodiments, the DCA 120 may be located elsewhere on the headset 100 and/or may include additional cameras.

Figure 1B:
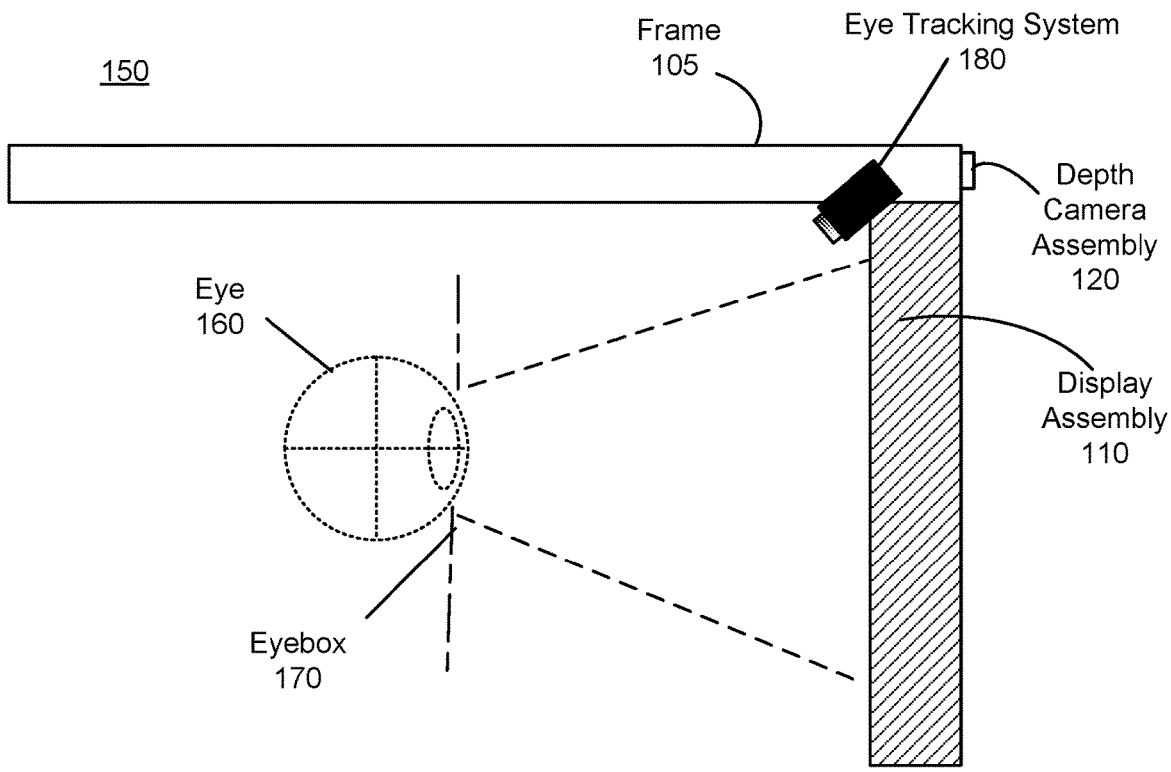
FIG. 1B is a cross-section of the headset illustrated in FIG. 1A, in accordance with one or more embodiments.

FIG. 1B is a cross-section 150 of the headset 100 illustrated in FIG. 1A, in accordance with one or more embodiments. The display assembly 110 presents content (i.e., image light) to an eye 160 in an eyebox 170. The eyebox 170 is a location where the eye 160 is positioned when the user wears the headset 100. For purposes of illustration, FIG. 1B shows the cross section 150 associated with a single eye 160 and the display assembly 110, but in alternative embodiments not shown, another display assembly which is separate from the display assembly 110 shown in FIG. 1B, provides image light to an eyebox of another eye of the user. In some embodiments, the headset 100 includes an eye tracking system 180. Additionally, in other embodiments, the eye tracking system 180 may be positioned on the headset 100 in locations different from those shown in FIG. 1B.

The eye tracking system 180 is configured to determine eye tracking information for the eye 160. The determined eye tracking information may comprise information about an orientation of the eye 160 in the eyebox 170, e.g., information about an angle of an eye-gaze. The eye tracking system 180 may be any eye tracking system known by one skilled in the art. The eye tracking system 180 includes one or more projectors and one or more cameras. The one or more projectors illuminates the eye with infrared (IR) light, e.g., an infrared flash (e.g., used for time-of flight depth determination), structured light pattern, a glint pattern, etc. The one or more cameras captures images of the 160 illuminated with the IR light from the projector, and the eye tracking system 180 determines depth information using the captured images and a depth determination technique. Depth determination techniques may include, e.g., structured light, time-of-flight, stereo imaging, some other depth determination methodology familiar to one skilled in the art, etc.

The eye tracking system 180 generates eye tracking information of the eye 250 based on the depth information. Eye tracking information includes, e.g., movement information, position and orientation, gaze direction (e.g., where a user is looking), vergence, etc. In some embodiments, the eye tracking system 180 provides the generated eye tracking information to the display assembly 110. The display assembly 110 may utilize the eye tracking information (e.g., gaze direction) to dynamically adjust brightness of portions of a composite FOV to mitigate visibility of a seam within the composite FOV.

Figure 2:
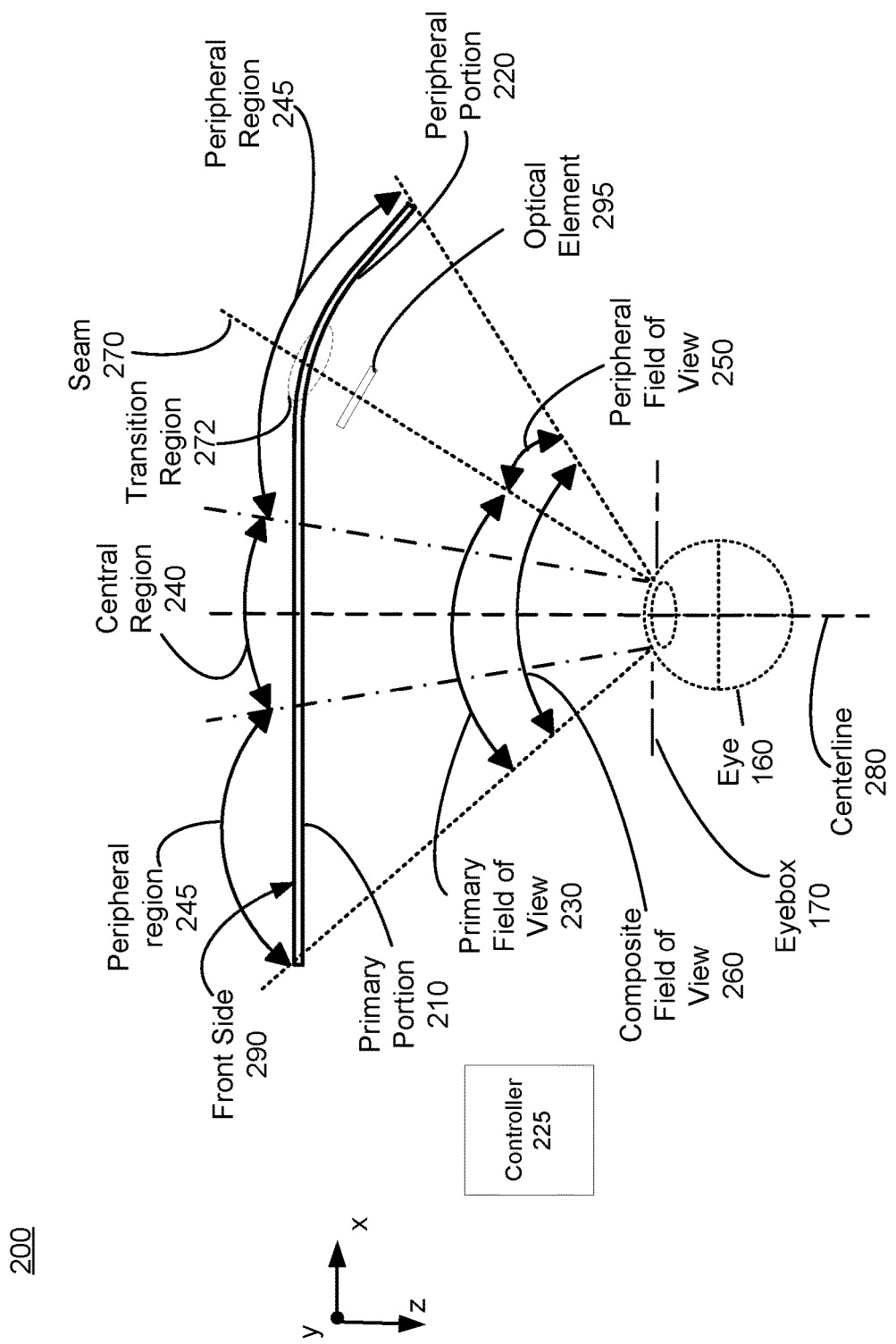
FIG. 2 is an example display assembly, in accordance with one or more embodiments.

FIG. 2 is an example display assembly 200, in accordance with one or more embodiments. The display assembly 200 provides content to the eyebox 170. The display assembly 200 is an embodiment of the display assembly 110. The display assembly 200 may be incorporated into a headset (e.g., the headset 100), a HMD, some other device, or some combination thereof. For purposes of illustration, FIG. 2 shows the display assembly 200 associated with a single eye 160 (right eye). In some embodiments, another display assembly separate (or partially separate) from the display assembly 200, provides image light to the other eye (e.g., the left eye) of the user. In a partially separate system, one or more components may be shared between display assemblies each eye.

The display assembly 200 may be a waveguide display (e.g., as discussed below with regard to FIGS. 3 and 4), an electronic display (e.g., as discussed below with regard to FIG. 5), a projector display (e.g., as discussed below with regard to FIG. 6), or some combination thereof. The display assembly 200 includes a controller 225 and may include, e.g., a waveguide, one or more sources, one or more coupling elements, one or more decoupling elements, a lens, a reflector, a projector, a correcting lens, or some combination thereof. The display assembly 200 includes a primary portion 210 and a peripheral portion 220. The primary portion 130 is an embodiment of the primary portion 210 and the primary portion 140 is an embodiment of the peripheral portion 220.

The primary portion 210 of the display assembly 200 emits a first portion of image light over a primary FOV 230. The primary FOV 230 includes a central region 240 that corresponds to a region in front of a user which is likely to include a gaze location (i.e., a foveal FOV of the eye 160) of the user. The primary portion 210 of the display assembly 200 is positioned such that the primary FOV 230 generally corresponds to gaze locations in front of a user (e.g., user is looking straight ahead). Additionally, while the primary portion 210 of the display assembly 200 is flat as illustrated, in alternate embodiments, the primary portion 210 of the display assembly 200 may be curved. The curvature may be in one (e.g., x or y), two dimensions (e.g., x and y), freeform, or some combination thereof.

The peripheral portion 220 of the display assembly 200 emits a second portion of the image light over a peripheral FOV 250. The peripheral FOV 250 is smaller than the primary FOV 230. The peripheral portion 220 of the display assembly 200 is positioned such that the peripheral FOV 250 generally corresponds to gaze locations towards a temple of the user (e.g., to a user's right). Note in some embodiments, some or all of the second portion of the image light emitted by the peripheral portion 220 of the display assembly 200 is at a lower resolution than at least some of the first portion of the image light emitted by the display assembly 210. Additionally, while the peripheral portion 220 of the display assembly 200 is flat as illustrated, in alternate embodiments, the peripheral portion 220 of the display assembly 200 may be curved. The curvature may be in one dimension, two dimensions, freeform, or some combination thereof. The peripheral portion 220 may be optimized for peripheral perception. For example, compared to the primary portion 210, the peripheral portion 220 may have a lower resolution, a lower color depth, a lower pixel bit depth, or different frame rates. Frame rates in the peripheral display may be either higher or lower, depending on the application.

Moreover, in some embodiments, the peripheral portion 220 and the primary portion 210 are different types of displays. For example, the primary portion 220 may be a waveguide display, and the peripheral portion 220 may be an electronic display or projector display.

The primary FOV 230 and the peripheral FOV 250 create a composite FOV 260 from the perspective of the eyebox 170. The composite FOV 260 include the central region 240 and a peripheral region 245. Note a person generally looks forward, and often will turn their head in a particular direction to look at an object instead of merely moving their eyes to look at the object. Accordingly, the central region 240 corresponds to a region in front of a user which is likely to include a gaze location (i.e., a foveal FOV of the eye 160) of the user. The central region 240 may, for example, span 60 degrees (i.e., 30 degrees on either side of a centerline 280). In other embodiments, the central region 240 may be larger (e.g., 60 or 70 degrees) or smaller (e.g., 40 or 50 degrees). Note that the central region 240 may have a different angular spread for different dimensions or it may be circularly symmetric about the centerline 280. A region outside of the target FOV 240 is referred to as a peripheral region 245. As the target FOV 240 is a region that is likely to include a foveal FOV of the eye 160, the peripheral region 245 corresponds to a region that is generally viewed by a lower acuity part part of the eye 160 (i.e., peripheral vision).

The primary portion 210 of the display assembly 200 and the peripheral portion 220 of the display assembly 200 come together in a transition region 272. Together the primary FOV 230 and the peripheral FOV 250 create the composite FOV 260 from the perspective of the eyebox 170. The transition region 272 is a location where the waveguide 205 has a radius of curvature that is greater than a threshold value. Accordingly, the primary portion 220 and the peripheral portion 230 are canted relative to each other based in part on an amount of curvature imparted in the transition region 272.

The transition region 272 causes a seam 270 in the composite FOV 260. The seam 270 is an area where optical error is introduced to the image light by curvature in the transition region 272. The seam 270 occurs over an area that is at most the size of the transition region 272. The seam corresponds to a portion of the transition region 272 of the display assembly 200 where the primary portion 210 of the display assembly 200 and the peripheral portion 220 of the display assembly 200 meet, and the transition region 272 has a radius of curvature. The transition region 272 is positioned such that the seam 270 is located within the peripheral region 245 of the composite FOV 260. Accordingly, it is likely that the seam 270 generally would fall on a low-resolution portion (non-foveal region) of a retina of the eye 160. In some embodiments, the seam 270 is located at least 35 degrees off center (i.e., an angle between the centerline 280 and the seam 270 is at least 35 degrees). The centerline 280 is a direction that corresponds to a gaze direction of the eye 270 looking straight ahead. In some embodiments, the centerline 280 is positioned such that it passes through a central point of the center region 240.

The controller 225 controls the display assembly 200. The controller 225 provides instructions that control how content is rendered by the primary portion 210 and the peripheral portion 220 of the display assembly 200. Note that the controller 225 is communicatively coupled to both the display assembly 200, and that the couplings have been omitted from the figure for ease of illustration.

Locating the transition region 272 such that the seam 270 is outside of the central region 240 mitigates chances of the eye 270 seeing it (as it would be outside a foveal region of user's gaze). However, the seam 270 may still be within a field of view of the eye 160, and in some cases, the eye 160 may change its gaze location such that a foveal region of the eye 160 would include the seam 270. To help offset visibility of the seam 270, in some embodiments, the controller 225 instructs the display assembly 200 to adjust brightness of emitted image light in some or all of, one or both of the primary portion 210 of the display assembly 200 and the peripheral portion 220 of the display assembly 200. For example, the controller 225 may instruct the display assembly 200 to adjust brightness of emitted image light that correspond to portions of the seam 270 and/or image light surrounding the seam 270. The adjusted brightness is such that a brightness of a portion of the image light in the primary FOV 230 adjacent to the seam 270, a brightness of a portion of the image light in peripheral FOV 250 adjacent to the seam 270, and a brightness of the seam 270 are all within a threshold value of each other (e.g., all within 20% of each other). In some instances, the threshold value is such that brightness, as viewed from the eyebox 170, appears to be substantially uniform (e.g., all within 5% of each other) across the seam 270 and the portions of the primary FOV 230 and the peripheral FOV 250 that are adjacent to the seam 270.

In some embodiments, the controller 225 may use a geometry of the display assembly 200 to mitigate optical error introduced by the beam region 272. As the geometry (i.e., the shape/curvature) of the display assembly 200 is known, the controller 225 may instruct the display assembly 200 to pre-distort some of the image light such that it offsets at least some of the optical error introduced by the transition region 272. The geometry and brightness of the display may be adjusted at the time of manufacture, adjusted by the user, may be self-adjusted using, for example, an on-line or off-line camera used to calibrate the displays using user information, such as the user's interpupillary distance (IPD), or dynamically using information for example from an eye tracking system.

In some embodiments, the controller 225 may use eye tracking information from an eye tracking system (e.g., the eye tracking system 180) to dynamically offset optical error caused by the transition region 272. For example, the transition region 272 may results in a non-uniform brightness profile within the transition region 272 surrounding the seam 270. The controller 225 may instruct the display assembly 200 to adjust brightness of some or all of the primary portion 210 of the display assembly 200 and the peripheral portion 220 of the display assembly 200 to account for the change in brightness caused by the transition region 272. For example, if a gaze location of the eye 160 is within a threshold distance (e.g., a distance corresponding to 2 degrees of FOV) of the seam 270, the controller 225 may instruct the display assembly 200 to adjust brightness of emitted image light that corresponds to some or all of portions of the seam 270 and/or some or all of the portions of the image light surrounding the seam 270 such that they have a brightness value within a threshold value of each other.

In some embodiments, the display assembly 200 includes an optical element 295 between the transition region 272 and the eyebox 170. The optical element 295 is configured to mitigate (e.g., offset) the optical error introduced by the transition region 272. The optical element 295 may be, e.g., a meniscus lens, a 1-dimensional Fresnel lens, some other optical element that can mitigate optical error introduced by the transition region 272, or some combination thereof. Additionally, while a single optical element 295 is shown, in other embodiments, a plurality of optical elements 295 are positioned (e.g., in parallel and/or optical series) to mitigate optical error introduced by the transition region 272.

Moreover, in some AR and/or VR embodiments at least correcting lens is adjacent and/or coupled to a front side 290 of the display assembly 200. The correcting optic offsets optical power imparted, by the display assembly 200, to light from a local area (e.g., in front of display assembly 200) that passes through the display assembly 200 prior to reaching the eyebox 170.

Note, while there is no overlap in the primary FOV 230 and the peripheral FOV 250, in some embodiments, there is overlap between the primary FOV 230 and the peripheral FOV 250. For example, the primary FOV 230 may be −30 degrees to +30 degrees, and the peripheral FOV 250 may be 20 degrees to 60 degrees.

Figure 3:
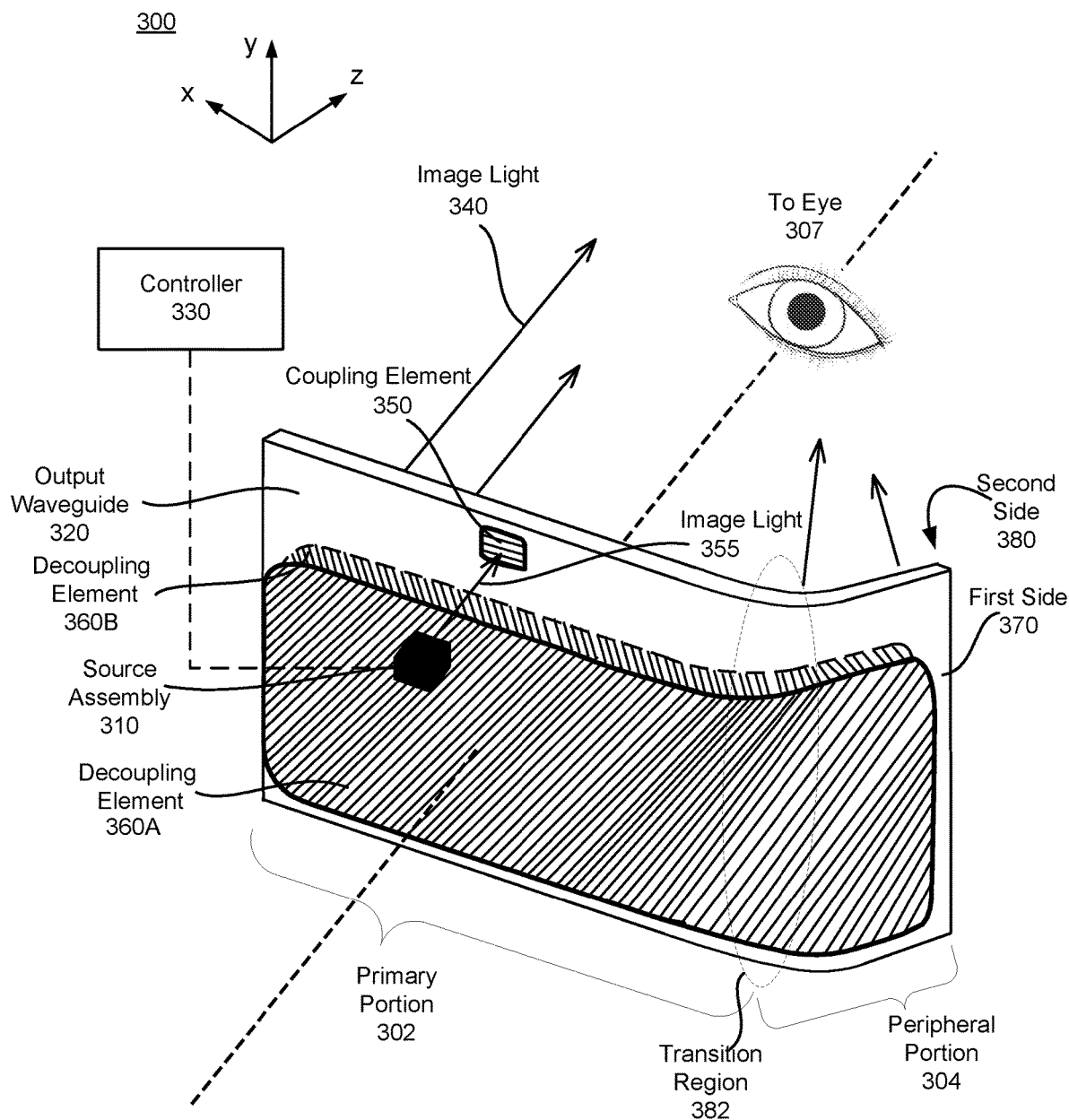
FIG. 3 illustrates an isometric view of a waveguide display, in accordance with one or more embodiments.

FIG. 3 illustrates an isometric view of a waveguide display 300, in accordance with one or more embodiments. The waveguide display 300 is an embodiment of the display assembly 200. The waveguide display 300 includes a primary portion 302 and a peripheral portion 304 which are embodiments of the primary portion 210 and the peripheral portion 220. In alternate embodiments, the waveguide display 300 is modified such that it functions as only the primary portion 302 or the peripheral portion 304. Note that additional detail regarding operation of waveguide displays may be found in U.S. application Ser. No. 15/704,190, which is incorporated by reference in its entirety.

The waveguide display 300 includes at least one source assembly 310, an output waveguide 320, and a controller 330. For purposes of illustration, FIG. 3 shows the waveguide display 300 associated with a single eye 307 (left eye), but in some embodiments, another waveguide display separate (or partially separate) from the waveguide display 300, provides image light to another eye (e.g., the eye 160) of the user. In a partially separate system, one or more components may be shared between waveguide displays for each eye.

The source assembly 310 generates image light. The source assembly 310 generates and outputs image light 355 to a coupling element 350 located on a first side 370 of the output waveguide 320. The source assembly 310 includes a source and an optics system. In some embodiments, the source is a single source or a strip source that is scanned to form image light. In other embodiments, the source emits a 2-dimensional image as image light. The source may be, e.g., laser diode, a vertical cavity surface emitting laser, a light emitting diode, a tunable laser, a MicroLED, a superluminous LED (SLED), a liquid crystal display (LCD), an organic light emitting diode (OLED) display, an active-matrix organic light-emitting diode display (AMOLED), a micro-display, some light source that emits coherent or partially coherent light, or some combination thereof. The source emits light in a visible band (e.g., from about 390 nm to 700 nm), and it may emit light that is continuous or pulsed. The source emits light in accordance with one or more illumination parameters received from the controller 330. An illumination parameter is an instruction used by the source to generate light. An illumination parameter may include, e.g., restriction of input wave vector for total internal reflection, restriction of input wave vector for maximum angle, source wavelength, pulse rate, pulse amplitude, beam type (continuous or pulsed), other parameter(s) that affect the emitted light, or some combination thereof.

The optics system includes one or more optical components that condition the light from the source. Conditioning light from the source may include, e.g., expanding, collimating, scanning, adjusting orientation in accordance with instructions from the controller 330, some other adjustment of the light, or some combination thereof. The one or more optical components may include, e.g., lenses, scanning mirrors, micro-electro-mechanical systems (MEMS) scanning mirrors, liquid lens, apertures, gratings, or some combination thereof. Light emitted from the optics system (and also the source assembly 310) is referred to as image light 355. The optics system outputs the image light 355 at a particular orientation (in accordance with the display instructions) toward the output waveguide 320.

Figure 4:
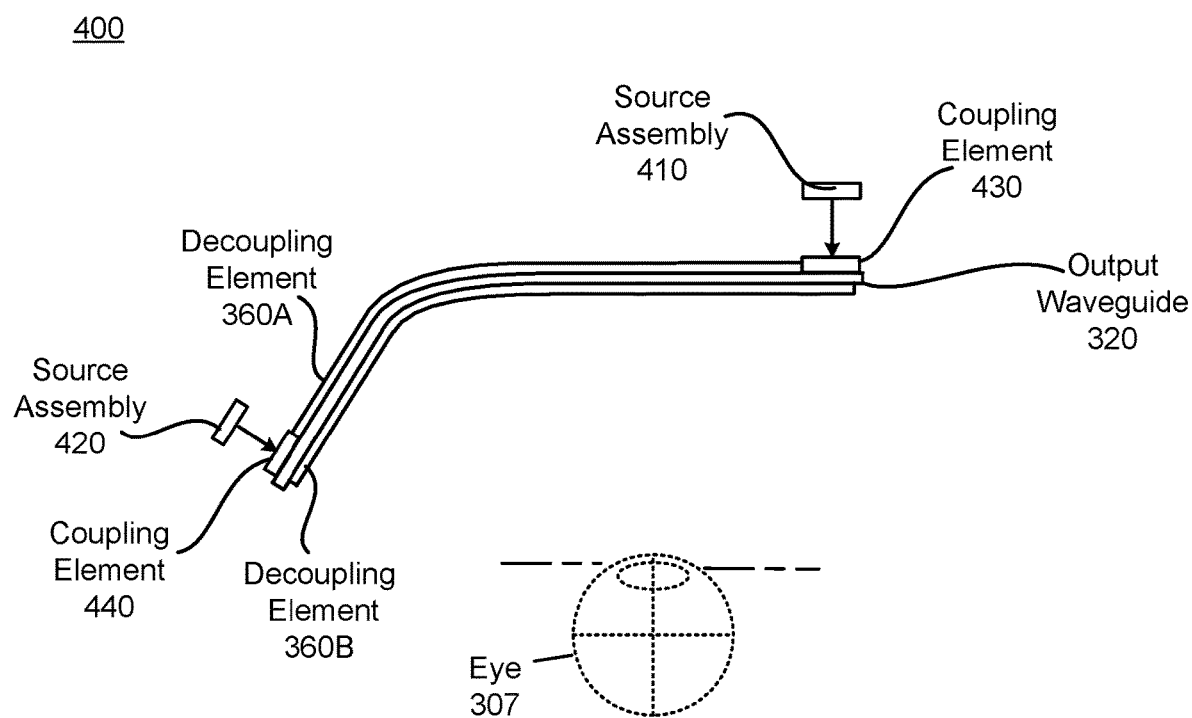
FIG. 4 is an example waveguide display including multiple source assemblies, in accordance with one or more embodiments.

Note that while FIG. 3 illustrates a single source assembly 310, in other embodiments (e.g., as shown in FIG. 4), there may be a plurality of source assemblies. Moreover, respective image light from the plurality of source assemblies may incouple via different coupling elements located on different areas of the output waveguide 320. In some embodiments, light from a single source assembly 310 may be coupled into multiple output waveguides.

The output waveguide 320 is an optical waveguide that outputs image light to an eye 220 of a user. The output waveguide 320 receives the image light 355 at one or more coupling elements 350 located on the first side 370, and guides the received input image light to decoupling element 360A. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, an array of holographic reflectors, or some combination thereof. In some configurations, each of the coupling elements 350 have substantially the same area along the X-axis and the Y-axis dimension, and are separated by a distance along the Z-axis (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The coupling element 350 has a first grating vector. The pitch of the coupling element 350 may be 300-600 nm.

The decoupling element 360A redirects the total internally reflected image light from the output waveguide 320 such that it may be decoupled via the decoupling element 360B. The decoupling element 360A is part of, or affixed to, the first side 370 of the output waveguide 320. The decoupling element 360B is part of, or affixed to, the second side 380 of the output waveguide 320, such that the decoupling element 360A is opposed to the decoupling element 360B. Opposed elements are opposite to each other on a waveguide. In some configurations, there may be an offset between the opposed elements. For example, the offset can be one quarter of the length of an opposed element.

The decoupling elements 360A and 360B may be, e.g., a diffraction grating, or a holographic grating, one or more cascaded reflectors, one or more prismatic surface elements, an array of holographic reflectors. In some configurations, each of the decoupling elements 360A have substantially the same area and are separated by a thickness of the waveguide body (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The decoupling element 360A has an associated second grating vector, and the decoupling element 360B has an associated third grating vector. An orientation and position of the image light exiting from the output waveguide 320 is controlled by changing an orientation and position of the image light 355 entering the coupling element 350. The pitch of the decoupling element 360A and/or the decoupling element 360B may be 300-600 nm. In some configurations, the coupling element 350 couples the image light into the output waveguide 320 and the image light propagates along one dimension. The decoupling element 360A receives image light from the coupling element 350 covering a first portion of the first angular range emitted by the source assembly 310 and diffracts the received image light to another dimension. Note that the received image light is expanded in 2D until this state. The decoupling element 360B diffracts a 2-D expanded image light toward the eyebox. In alternate configurations, the coupling element 350 couples the image light into the output waveguide 320 and the image light propagates along one dimension. The decoupling element 360B receives image light from the coupling element 350 covering a first portion of the first angular range emitted by the source assembly 310 and diffracts the received image light to another dimension. The decoupling element 360A diffracts the image light toward the eyebox.

The coupling element 350, the decoupling element 360A, and the decoupling element 360B are designed such that a sum of their respective grating vectors is less than a threshold value, and the threshold value is close to or equal to zero.

Accordingly, the image light 355 entering the output waveguide 320 is propagating in the same direction when it is output as image light 340 from the output waveguide 320. Moreover, in alternate embodiments, additional coupling elements and/or de-coupling elements may be added. And so long as the sum of their respective grating vectors is less than the threshold value, the image light 355 and the image light 340 propagate in the same direction. The location of the coupling element 350 relative to the decoupling element 360A and the decoupling element 360B as shown in FIG. 3 is only an example. In other configurations, the location could be on any other portion of the output waveguide 320 (e.g. a top edge of the first side 370, a bottom edge of the first side 370). In some embodiments, the waveguide display 300 includes a plurality of source assemblies 310 and/or a plurality of coupling elements 350 to further increase the FOV and/or eyebox.

The output waveguide 320 includes a waveguide body with the first side 370 and a second side 380 that are opposite to each other. In the example of FIG. 3, the waveguide body includes the two opposite sides—the first side 370 and the second side 380. The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor.

The primary portion 302 of the waveguide display 300 and the peripheral portion 304 of the waveguide display 300 come together in a transition region 382. The transition region 382 is a location where the output waveguide 320 has a radius of curvature that is greater than a threshold value. Accordingly, the primary portion 302 and the peripheral portion 304 are canted relative to each other based in part on an amount of curvature imparted in the transition region 382. The transition region 382 causes a seam in a composite FOV of the waveguide display 300.

The controller 330 controls operation of the source assembly 310. The controller 330 is an embodiment of the controller 225. The controller 330 determines display instructions for the source assembly 310. The display instructions are generated based at least on the one or more display instructions generated by the controller 330. Display instructions are instructions to render one or more images. In some embodiments, display instructions may simply be an image file (e.g., bitmap). The display instructions may be received from, e.g., a console of a system (e.g., as described below in conjunction with FIG. 8). Display instructions are instructions used by the source assembly 310 to generate image light 340. The display instructions may include, e.g., a type of a source of image light (e.g. monochromatic, polychromatic), a scanning rate, an orientation of a scanning apparatus, one or more illumination parameters, or some combination thereof.

The display instructions may also selectively adjust brightness of particular regions of the image light 340 (e.g., to mitigate visibility in a seam in a composite FOV). The controller 330 includes a combination of hardware, software, and/or firmware not shown here so as not to obscure other aspects of the disclosure.

In alternate configurations (not shown), the output waveguide 320 includes the coupling element 350 on the first side 370 and a second coupling element (not shown here) on the second side 380. The coupling element 350 receives an image light 355 from the source assembly 310. The coupling element on the second side 380 receives an image light from the source assembly 310 and/or a different source assembly.

The controller 330 determines the display instructions for the source assembly 310 based at least on the one or more display instructions.

In alternate configurations, the output waveguide 320 may be oriented such that the source assembly 310 generates the image light 355 propagating along an input wave vector. The output waveguide 320 outputs the image light 340 propagating along an output wave vector that matches the input wave vector. In some configurations, the image light 340 is a monochromatic image light that can be projected on multiple planes (e.g. multi-planar monochromatic display). In alternate configurations, the image light 340 is a polychromatic image light that can be projected on multiple planes (e.g. multi-planar polychromatic display).

In some embodiments, the output waveguide 320 outputs the expanded image light 340 to the user's eye 220 with a very large FOV. For example, the expanded image light 340 provided to the user's eye 220 with a diagonal FOV (in x and y) of at least 60 degrees. The output waveguide 320 is configured to provide an eyebox of with a length of at least 20 mm and a width of at least 10 mm. Generally, the horizontal FOV is larger than the vertical FOV. If the aspect ratio is 16:9, the product of the horizontal FOV and the vertical FOV may be ~52×30 degrees whose diagonal FOV is 60 degrees for instance.

In some embodiments, the waveguide display 300 includes an additional optical element (e.g., the optical element 295) between the transition region 382 and the eyebox to offset the optical error introduced by the transition region 382.

FIG. 4 is an example waveguide display 400 including multiple source assemblies, in accordance with one or more embodiments. The waveguide display 400 is substantially the same as the waveguide display 300 except that it includes a source assembly 410, a source assembly 420, a coupling element 430, and a coupling element 440. The source assemblies 410, 420 and the coupling elements 430, 440 are substantially the same as the source assembly 310 and the coupling element 350, respectively.

The source assembly 410 generates first image light which is incoupled into the output waveguide 320 via the coupling element 430. Likewise, the source assembly 420 generates second image light which is incoupled into the output waveguide 320 via the coupling element 440. The first image light and second image light are then output via the decoupling elements 360A and 360B towards the eye 307 over a composite FOV in the manner described above with regard to FIG. 3. In some embodiments, the first image light is output over a primary FOV (e.g., the primary FOV 230) and the second image light is output over a peripheral FOV (e.g., the peripheral FOV 250). In some embodiments, some portion of the first image light is output over the primary FOV as well as a portion of the peripheral FOV. In some embodiments, some portion of the second image light is output over the peripheral FOV as well as a portion of the primary FOV.

Figure 5:
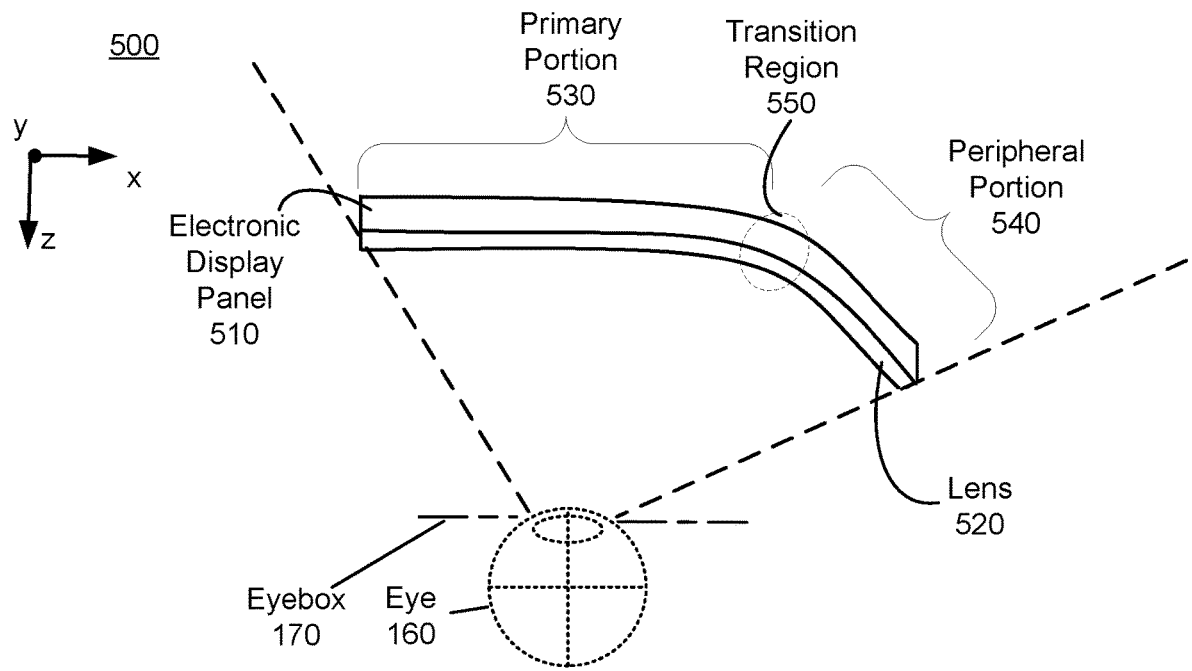
FIG. 5 is an example electronic display, in accordance with one or more embodiments.

FIG. 5 is an example electronic display 500, in accordance with one or more embodiments. The electronic display 500 is an embodiment of the display assembly 200. The electronic display 500 includes at least one electronic display panel 510 and a lens 520. For purposes of illustration, FIG. 5 shows the electronic display 500 associated with a single eye 160, but in some embodiments, another electronic display separate (or partially separate) from the electronic display 500, provides image light to another eye of the user. In a partially separate system, one or more components may be shared between projector displays for each eye.

The electronic display 500 includes a primary portion 530 and a peripheral portion 540 which are embodiments of the primary portion 210 and the peripheral portion 220, respectively. The primary portion 530 of the electronic display 500 and the peripheral portion 5540 of the electronic display 500 come together in a transition region 550. The transition region 550 is an embodiment of the transition region 272.

The electronic display panel 510 generates image light using a two-dimensional array of pixels. An electronic display panel 510 may be, e.g., a liquid crystal display (LCD), an organic light emitting diode (OLED) display, an active-matrix organic light-emitting diode display (AMO-LED), a transparent OLED (TOLED), some other 2-D array of pixels, or some combination thereof. A TOLED may be used in augmented/mixed reality applications. The electronic display panel 510 is flexible and is curved in one or more dimensions. Note, while FIG. 5 shows a single electronic display panel 510, in other embodiments, multiple electronic display panels may be used (e.g., abutted against each other).

The lens 520 directs light the image light emitted by the electronic display panel 510 to the eyebox 170. In some embodiments, the lens 520 magnifies received image light from the electronic display panel 510, corrects optical errors associated with the image light, and presents the corrected image light to the eyebox 170. In some embodiments, the lens 520 may be directly affixed to an emission surface of the electronic display panel 510. In some embodiments, a gap (~several mm) is between the lens 520 and the electronic display panel 510.

In the illustrated embodiments, the lens 520 is a single optical element. In other embodiments, the lens 520 includes one or more optical elements and/or combinations of different optical elements. For example, an optical element is an aperture, a meniscus lens, a Fresnel lens (e.g., a 1-dimensional Fresnel lens), a convex lens, a concave lens, a filter, or any other suitable optical element that affects the image light emitted from the electronic display panel 510. In some embodiments, some or all of the lens 520 is formed to mitigate the optical error introduced by the transition region 550. In some embodiments, the electronic display 500 includes an additional optical element (e.g., the optical element 295) between the lens 520 and the eyebox 170 to offset the optical error introduced by the transition region 550.

Magnification of the image light by the lens 520 allows the electronic display panel 510 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases, all of the user's field of view. In some embodiments, the lens 520 is designed to correct one or more types of optical errors (e.g., barrel distortion, pincushion distortion, longitudinal chromatic aberration, transverse chromatic aberration, spherical aberration, comatic aberration, field curvature, astigmatism, etc.).

Figure 6:
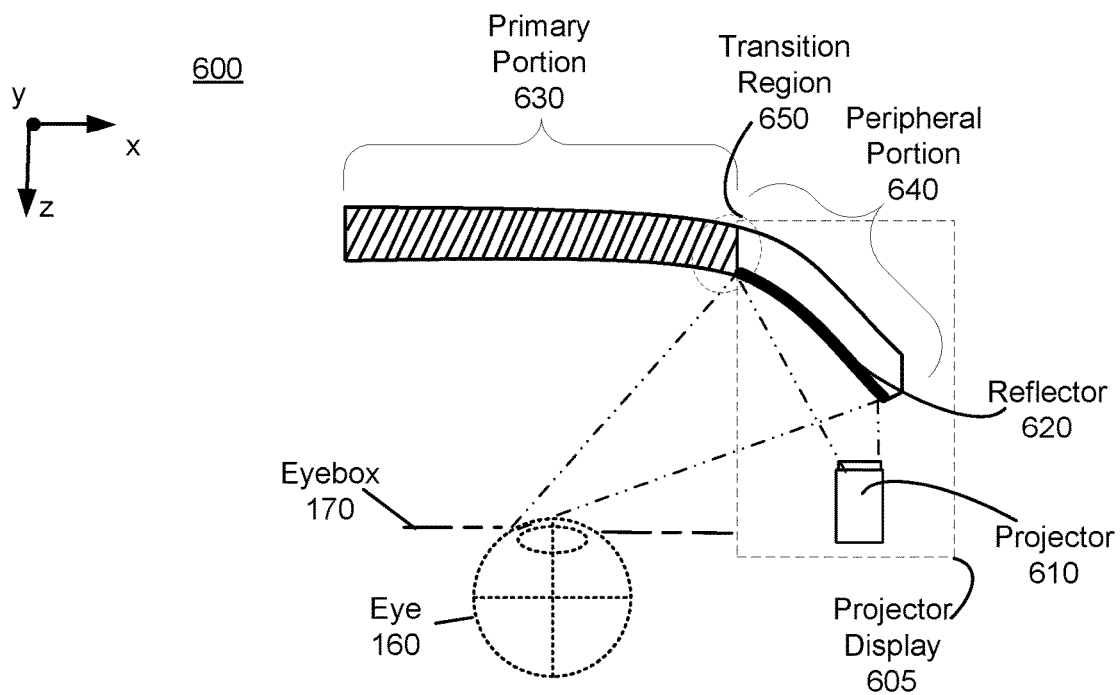
FIG. 6 is an example display assembly that includes a projector display, in accordance with one or more embodiments.

FIG. 6 is an example display assembly 600 that includes a projector display 605, in accordance with one or more embodiments. The projector display 605 is an embodiment of the display assembly 200. The projector display 605 includes a projector 610 and a reflector 620. For purposes of illustration, FIG. 6 shows the projector display 605 associated with a single eye 160, but in some embodiments, another electronic display separate (or partially separate) from the projector display 605, provides image light to another eye of the user. In a partially separate system, one or more components may be shared between projector displays for each eye.

The display assembly 600 includes a primary portion 630 and a peripheral portion 640 which are embodiments of the primary portion 210 and the peripheral portion 220, respectively. The primary portion 630 of the display assembly 600 and the peripheral portion 640 of the projector display 605 come together in a transition region 650. The transition region 650 is an embodiment of the transition region 272.

In the illustrated embodiment, the projector display 605 is configured to provide image light over a peripheral FOV, and the primary portion 630 may be a waveguide display, an electronic display, or a projector display. In other embodiments, the primary portion 630 of the display assembly 600 is a projector display and the peripheral portion 640 may be a waveguide display, an electronic display, or a projector display. In some embodiments, both the primary portion 630 and the peripheral portion 640 are the same type of display (e.g., both are projector displays).

The projector 610 generates image light. The projector 610 generates a 2D image and projects the generated 2D image onto the reflector 620. The projector 610 includes a source and an optical assembly. The source emits light. The source emits light in a visible band (e.g., from about 390 nm to 700 nm), and it may emit light that is continuous or pulsed. The source emits light in accordance with one or more illumination parameters received from the controller 225.

In some embodiments, the source is a liquid crystal display (LCD), an organic light emitting diode (OLED) display, an active-matrix organic light-emitting diode display (AMOLED), a micro-display, or some other display that emits a 2D image. Alternatively, the source is a single light source, or includes one or more strip sources that emit light which is scanned to form the image light.

For example, the projector 610 may include an emitter or array of emitters arranged as a strip source. A strip source is a rectangular array of light emitters. A light emitter is a device that emits light. A light emitter may be, e.g., a light emitting diode (LED), a microLED, a tunable laser, a VCSEL, a laser diode, some other device that emits light, or some combination thereof. A strip source may be a 1-dimensional array (e.g., 1×1000 pixels) or a 2D array (e.g., 10×1000 pixels). In some embodiments, the light source is monochromatic. In other embodiments, the light source is polychromatic. For example, in some embodiments, a strip source in the light source may include sub-pixels of different colors (e.g., red, green, and blue). The light source 12 emits in one or more bands of light. The bands of light may include, e.g., visible light and/or infrared light. The projector 610 may include a mirror assembly that scans out the image light.

The optical assembly projects the generated image light onto the reflector 620. The optical assembly may include one or more lenses that condition the image light. Conditioning the image light may include, e.g., collimating, expanding, correcting aberration, etc.

The reflector 620 reflects the image light received from the projector 610 toward the eyebox 170. The reflector 620 includes a reflective material that reflects light in the visible band. The reflective material may be, e.g., polished aluminum, polished silver, etc. In some embodiments, the reflective material may be partially transmissive (e.g., for augmented/mixed reality applications). In some embodiments, the reflective material is a coating on a substrate (e.g., plastic, glass, etc.). While not shown, in some embodiments, the reflector 620 may be curved. The curvature may be in one axis, two axes, or be freeform.

In some embodiments, the display assembly 600 includes an additional optical element (e.g., the optical element 295) between the transition region 650 and the eyebox 170 to offset the optical error introduced by the transition region 650.

Figure 7A:
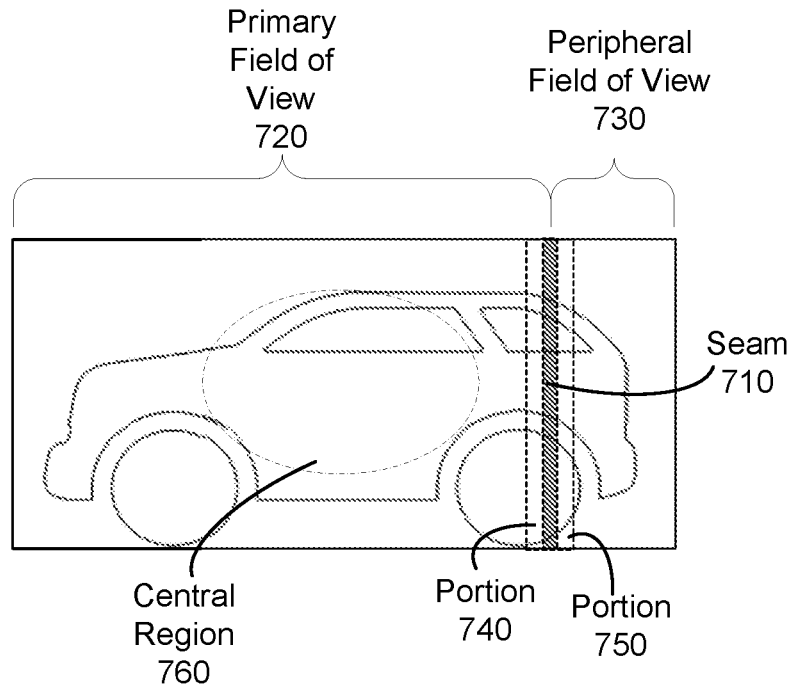
FIG. 7A is an example of a composite FOV with a visible seam, in accordance with one or more embodiments.

FIG. 7A is an example of composite FOV 700 with a visible seam 710, according to one or more embodiments. The composite FOV 700 is composed of image light presented by a display assembly (e.g., the display assembly 200) over a primary FOV 720 (e.g., emitted from the primary portion 210 of the display assembly 200) and a peripheral FOV 730 (e.g., emitted from the peripheral portion 220 of the display assembly 200) that are joined together. Note, in the illustrated example, there is no overlap in the primary FOV 720 and the peripheral FOV 730. In other embodiments, the primary FOV 720 and the peripheral FOV 730 overlap. The seam 710 is an area of the composite FOV 700 where optical error (e.g., distortion, aberration, non-uniform brightness, gaps in images, regions with two images superimposed on each other, etc.) in the image light is introduced due to the bending of the display assembly 200.

Note that a central region 760 of the composite FOV 700 does not include the seam 710. The central region 760 is an embodiment of the central region 240 and corresponds to a region in front of a user which is likely to include a gaze location. Placing the seam 710 outside of the central region 760 mitigates chances of the user seeing it (as it would be outside a foveal region of user's gaze). However, the seam 710 may still be within a peripheral field of view of the user, and in some cases, the user may change his/her gaze location such that a foveal region of the eye would include the seam 710. For example, as a user looks to the right of the composite image light 700 the seam 710 may fall into a foveal field of view of the eye.

Figure 7B:
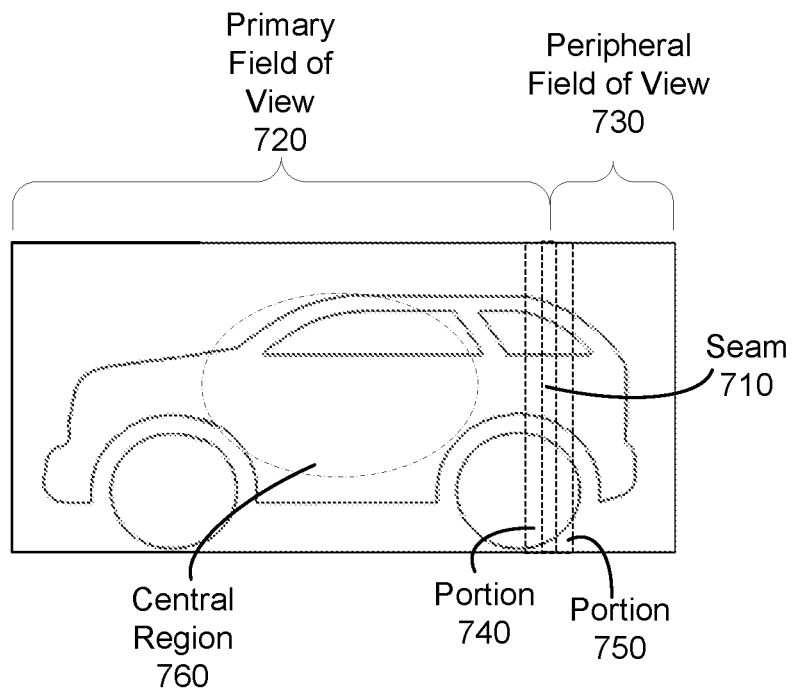
FIG. 7B is an example of mitigating the seam in the composite FOV of FIG. 6A, in accordance with one or more embodiments.

FIG. 7B is an example of mitigating the seam 710 in the composite FOV 700 of FIG. 7A, according to one or more embodiments. Visibility of the seam 710 is done by reducing differences in optical error between the seam 710 and the portions 740, 750 of the composite FOV 700 that are adjacent to the seam 710.

In some embodiments, a controller (e.g., the controller 225) instructs the display assembly 200 such that one or both of a peripheral portion 220 of the display assembly 200 and a primary portion 210 of the display assembly 200 adjust some portions of their emitted image light to account for the optical error that would otherwise occur at the seam 710. For example, the controller may instruct both of a peripheral portion 220 of the display assembly 200 and a primary portion 210 of the display assembly 200 to adjust brightness of emitted image light that correspond to portions of the seam 710 and/or image light surrounding the seam 710 (e.g., in portions 740 and 750). The adjusted brightness is such that a brightness of the portion 740 of the composite FOV 700 in the primary FOV 720, a brightness of the portion 750 of the composite FOV 700 in peripheral FOV 730, and a brightness of the seam 710 are all within a threshold value of each other (e.g., all within 20% of each other). In some instances, the threshold value is such that brightness, as viewed from the eyebox 170, appears to be substantially uniform (e.g., all within 5% of each other) across the seam 710 and the adjacent portions 740, 750 of the composite image light.

In some embodiments, the controller may use eye tracking information from an eye tracking system (e.g., the eye tracking system 180) to dynamically control some forms of optical error for some or all of one and/or both of the peripheral FOV 730 and/or the primary FOV 720. For example, if a gaze location of the eye is within a threshold distance (e.g., a distance corresponding to 2 degrees of FOV) of the seam 710 the controller may adjust instruct one or both a peripheral portion 220 of the display assembly 200 and a primary portion 210 of the display assembly 200 to adjust brightness of emitted image light that correspond to some or all of the seam 710, some or all of the portion 740 of image light, some or all of the portion 750 of image light, or some combination thereof, such that they all have a brightness value within a threshold value of each other (and in some embodiments appear substantially uniform).

Example of an Artificial Reality System

Figure 8:
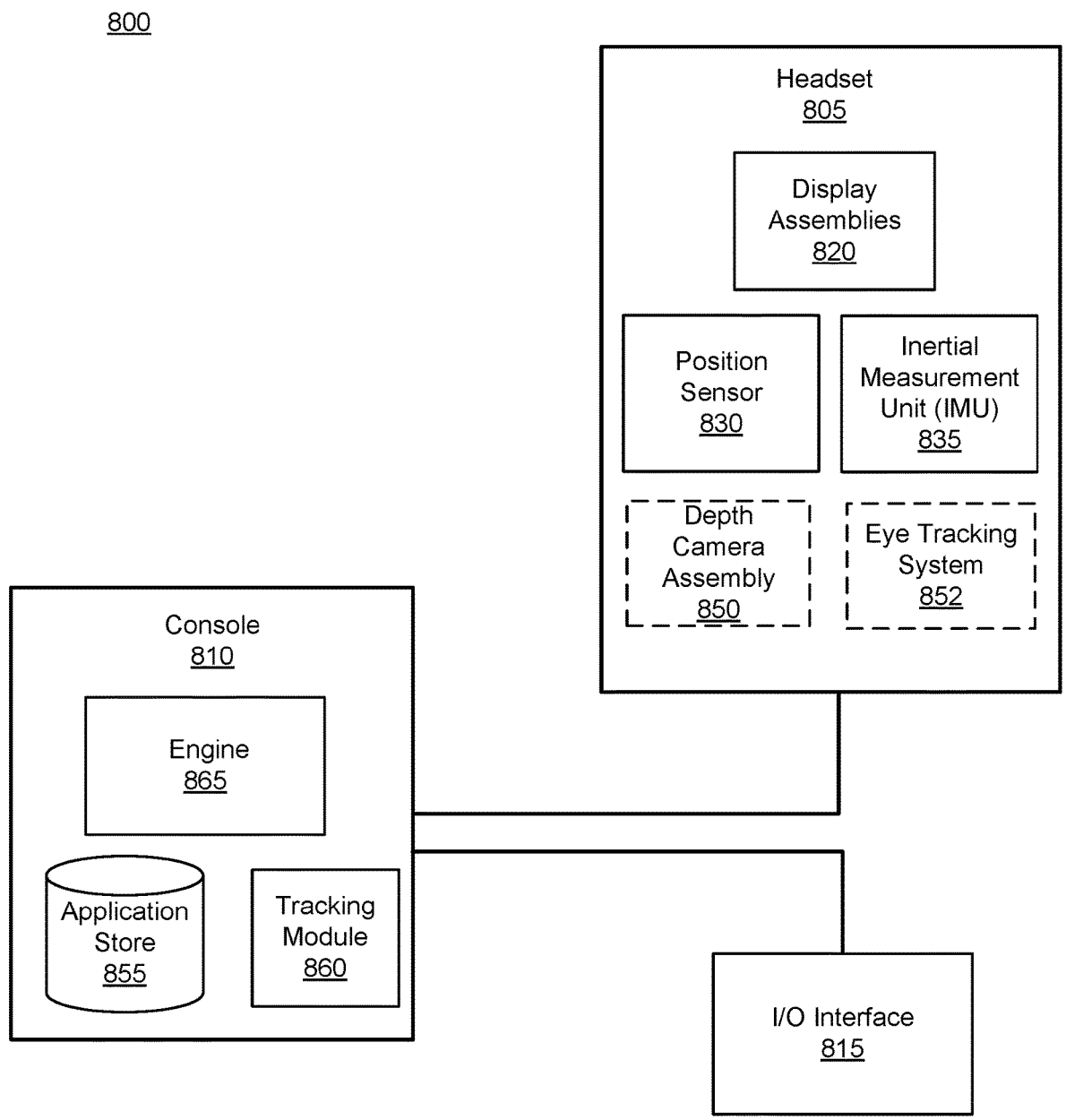
FIG. 8 is a block diagram of an example artificial reality system, in accordance with one or more embodiments.

FIG. 8 is a block diagram of an artificial reality system 800, according to one or more embodiments. The system 800 may operate in e.g., a VR system environment, an AR system environment, a MR system environment, or some combination thereof. The system 800 shown by FIG. 8 comprises a headset 805, a console 810, and an input/output (I/O) interface 815. While FIG. 8 shows an example system 800 including one headset 805 and on I/O interface 815, in other embodiments any number of these components may be included in the system 800. For example, there may be multiple headsets 805 each having an associated I/O interface 815, with each headset 805 and I/O interface 815 communicating with the console 810. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the headset 805.

The headset 805 may be a HMD or a NED that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 805, the console 810, or both, and presents audio data based on the audio information. An embodiment of the headset 805 is the headset 100 described above in conjunction with FIGS. 1A and 1B.

The headset 805 includes display assemblies 820. The headset may also include one or more position sensors 830, an inertial measurement unit (IMU) 835, an optional depth camera assembly (DCA) 850, and an optional eye tracking system 852. Some embodiments of the headset 805 have different components than those described in conjunction with FIG. 8. Additionally, the functionality provided by various components described in conjunction with FIG. 8 may be differently distributed among the components of the headset 805 in other embodiments.

The display assemblies 820 present content to the user. The display assemblies 820 include, for each eye, a respective display assembly. A display assembly emits image light over a composite FOV toward a corresponding eyebox. Each display assembly includes a primary portion and a peripheral portion that together emit the image light over a composite FOV from the perspective of the eyebox. A display assembly may be, e.g., a waveguide display, an electronic display, a projector display, or some other device that generates at least a portion of the image light, or some combination thereof. Each display assembly includes a curved section which causes a seam (region of increased optical error) in the composite FOV. The seam in the composite FOV is positioned outside a central region of the composite FOV. Additionally, visibility of the seams may be mitigated by, e.g., adjusting content (e.g., pre-distorting image light, adjusting brightness of image light, etc.) based in part on, e.g., a geometry of the display assembly, eye tracking information from the eye tracking system 852, or some combination thereof.

The IMU 835 is an electronic device that generates data indicating a position of the headset 805 based on measurement signals received from one or more of the position sensors 830 and from the depth information received from the DCA 850. A position sensor 830 generates one or more measurement signals in response to motion of the headset 805. Examples of position sensor 830 include: one or more accelerometers, one or more gyroscopes, one or more magnetometers, another suitable type of sensor that detects motion, a type of sensor used for error correction of the IMU 835, or some combination thereof. The position sensors 830 may be located external to the IMU 835, internal to the IMU 835, or some combination thereof.

Based on the one or more measurement signals from one or more position sensors 830, the IMU 835 generates data indicating an estimated current position of the headset 805 relative to an initial position of the headset 805. For example, the position sensors 830 include multiple accelerometers to measure translational motion (forward/back, up/down, left/right) and multiple gyroscopes to measure rotational motion (e.g., pitch, yaw, roll). In some embodiments, the IMU 835 rapidly samples the measurement signals and calculates the estimated current position of the headset 805 from the sampled data. For example, the IMU 835 integrates the measurement signals received from the accelerometers over time to estimate a velocity vector and integrates the velocity vector over time to determine an estimated current position of a reference point on the headset 805. Alternatively, the IMU 835 provides the sampled measurement signals to the console 810, which interprets the data to reduce error. The reference point is a point that may be used to describe the position of the headset 805. The reference point may generally be defined as a point in space or a position related to the orientation and position of the headset 805.

In some embodiments, the headset 805 further includes the DCA 850. The DCA may be an embodiment of the DCA 120. The DCA 850 captures data describing depth information of the local area surrounding the headset 805. In embodiments not shown the DCA 850 is external to the headset 805 and captures images of the headset 805 within the local area. The DCA 850 uses one or more depth determination techniques to determine depth information. The depth determination techniques may include, e.g., structured light, stereo vision, time of flight, some other depth determination technique, or some combination thereof. The DCA 850 can compute the depth information using the data, or the DCA 850 can send this information to another device such as the console 810 that can determine the depth information using data from the DCA 850.

The eye tracking system 852 tracks the user's eye. For example, the eye tracking system 852 projects structured light to the eye and collect structured light reflected back from the eye to determine a position and/or orientation of the eye. The eye tracking system 852 can detect gaze directions of the eye. The detected gaze directions can be used, e.g., by display blocks 820, to dynamically adjust brightness of portions of one or more display assemblies to mitigate visibility of seams. The eye tracking system 852 is an embodiment of the eye tracking system 180.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 835 that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the headset 805 for processing in accordance with information received from one or more of: the DCA 850, the headset 805, and the I/O interface 815. In the example shown in FIG. 8, the console 810 includes an application store 855, a tracking module 860, and an engine 865. Some embodiments of the console 810 have different modules or components than those described in conjunction with FIG. 8. Similarly, the functions further described below may be distributed among components of the console 810 in a different manner than described in conjunction with FIG. 8.

The application store 855 stores one or more applications for execution by the console 810. An application is a group of instructions, that when executed by a processor, generates content for presentation to the user. Content generated by an application may be in response to inputs received from the user via movement of the headset 805 or the I/O interface 815. Examples of applications include: gaming applications, conferencing applications, video playback applications, or other suitable applications.

The tracking module 860 calibrates the system 800 using one or more calibration parameters and may adjust one or more calibration parameters to reduce error in determination of the position of the headset 805 or of the I/O interface 815. For example, the tracking module 860 communicates a calibration parameter to the DCA 850 to adjust the focus of the DCA 850 to more accurately determine positions of structured light elements captured by the DCA 850. Calibration performed by the tracking module 860 also accounts for information received from the IMU 835 in the headset 805 and/or an IMU 835 included in the I/O interface 815. Additionally, if tracking of the headset 805 is lost (e.g., the DCA 850 loses line of sight of at least a threshold number of structured light elements), the tracking module 860 may re-calibrate some or all of the system 800.

The tracking module 860 tracks movements of the headset 805 or of the I/O interface 815 using information from the DCA 850, the one or more position sensor 630, the IMU 835 or some combination thereof. For example, the tracking module 860 determines a position of a reference point of the headset 805 in a mapping of a local area based on information from the headset 805. The tracking module 860 may also determine positions of the reference point of the headset 805 or a reference point of the I/O interface 815 using data indicating a position of the headset 805 from the IMU 835 or using data indicating a position of the I/O interface 815 from an IMU 835 included in the I/O interface 815, respectively. Additionally, in some embodiments, the tracking module 860 may use portions of data indicating a position or the headset 805 from the IMU 835 as well as representations of the local area from the DCA 850 to predict a future location of the headset 805. The tracking module 860 provides the estimated or predicted future position of the headset 805 and/or the I/O interface 815 to the engine 865.

In some embodiments, the engine 865 generates a three-dimensional mapping of the area surrounding the headset 805 (i.e., the "local area") based on information received from the headset 805. In some embodiments, the engine 865 determines depth information for the three-dimensional mapping of the local area based on information received from the DCA 850 that is relevant for techniques used in computing depth. The engine 865 may calculate depth information using one or more techniques in computing depth from the portion of the reflected light detected by the DCA 850, such as stereo based techniques, the structured light illumination technique, and the time-of-flight technique. In various embodiments, the engine 865 uses the depth information to, e.g., update a model of the local area, and generate content based in part on the updated model.

The engine 865 also executes applications within the system 800 and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual environment or in an environment augmenting the local area with additional content. Additionally, the engine 865 performs an action within an application executing on the console 810 in response to an action request received from the I/O interface 815 and provides feedback to the user that the action was performed. The provided feedback may be visual or audible feedback via the headset 805 or haptic feedback via the I/O interface 815.

In some embodiments, the engine 865 updates content based in part on geometries of the display assemblies 820. Using the known geometries (i.e., their curvatures) of the display assemblies 820 and in some cases the eye tracking information, the engine 865 generates rendering instructions. The engine 865 provides the rendering instructions to the headset 805 which causes the display assemblies 820 to render the image light in a manner that offsets optical error that would otherwise occur due to the curvature of the display assemblies 820.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
   a display assembly comprising:
      a source assembly configured to emit at least a portion of the image light;
      a waveguide that includes a peripheral portion and a primary portion;
      the primary portion and the peripheral portion of the waveguide coming together in a transition region with a radius of curvature that is greater than a threshold value;
      the primary portion configured to emit a first portion of image light over a first field of view (FOV), and the first FOV is positioned such that, for a user of the headset looking straight head, a foveal FOV of an eye of the user is within the first FOV; and the peripheral portion configured to emit a second portion of the image light over a second FOV, the peripheral portion canted relative to the primary portion, and wherein the emitted first portion of image light and the emitted second portion of image light create a composite FOV from the perspective of an eyebox, and a seam that corresponds to a portion of the transition region where the first FOV interfaces with the second FOV is positioned to be located in a peripheral region of the composite FOV, and the peripheral region is positioned such that, for the user looking straight head, the foveal FOV of the eye is outside of the peripheral region.

2. The headset of claim 1, wherein the peripheral portion of the display assembly has a first radius of curvature.

3. The headset of claim 1, wherein the display assembly includes a meniscus lens configured to correct optical error caused by the radius of curvature.

4. The headset of claim 1, wherein the display assembly includes a 1-dimensional Fresnel lens configured to correct optical error caused by the radius of curvature.

5. The headset of claim 1, wherein the seam is located at least 35 degrees off center, where center is a direction that corresponds to a gaze direction of the eye of the user looking straight ahead.

6. The headset of claim 1, wherein the seam includes a portion of the first FOV and a portion of the second FOV, further comprising:
an eye tracker configured to determine a gaze direction of a user of the headset; and
a controller configured to:
responsive to the determined gaze direction being within a threshold distance from the seam, instruct at least one of the primary portion of the display assembly and the peripheral portion of the display assembly to adjust brightness of emitted image light such that light which forms the portion of the first FOV and light which forms the portion of the second FOV are within a threshold value of each other.

7. The headset of claim 6, wherein the threshold value is such that brightness, as viewed from the eyebox, appears to be uniform across the seam and portions of the first FOV and the second FOV that are adjacent to the seam.

8. The headset of claim 1, wherein the seam includes a portion of the first FOV and a portion of the second FOV, further comprising:
a controller configured to:
receive an interpapillary distance of a user; and
instruct at least one of the primary portion of the display assembly and the peripheral portion of the display assembly to adjust brightness of emitted image light such that light which forms the portion of the first FOV and light which forms the portion of the second FOV are within a threshold value of each other according to the interpapillary distance.

9. The headset of claim 1, wherein the primary portion of the display assembly includes a first portion of an electronic display panel and a first portion of a lens, and the peripheral portion of the display assembly includes a second portion of the electronic display panel and a second portion of the lens.

10. The headset of claim 9, wherein the lens is directly coupled to an emission surface of the electronic display panel.

11. The headset of claim 1, wherein the display assembly further comprises:
a coupler that incouples the image light from the source assembly to the waveguide;
and at least one decoupler that decouples and directs the image light from the waveguide toward the eyebox over the composite FOV.

12. The headset of claim 1, wherein the peripheral portion of the display assembly includes a reflector and a projector, and the projector projects the second portion of the image light onto the reflector, and the reflector reflects the second portion of the image light over the second FOV towards the eyebox.

13. A display assembly comprising:
a source assembly configured to emit at least a portion of the image light;
a waveguide that includes a peripheral portion and a primary portion;
the primary portion and the peripheral portion of the waveguide coming together in transition region with a radius of curvature that is greater than a threshold value;
the primary portion configured to emit a first portion of image light, and having a first field of view (FOV)), and the first FOV is positioned such that, for a user of the display assembly looking straight head, a foveal FOV of an eye of the user is within the first FOV; and
the peripheral portion configured to emit a second portion of the image light over a second FOV, the peripheral portion canted relative to the primary portion, and
wherein the emitted first portion of image light and the emitted second portion of image light create a composite FOV from the perspective of an eyebox, and a seam that corresponds to a portion of the transition region where the first FOV interfaces with the second FOV is positioned to be located in a peripheral region of the composite FOV, and the peripheral region is positioned such that, for the user looking straight head, the foveal FOV of the eye is outside of the peripheral region.

14. The display assembly of claim 13, wherein the peripheral portion of the display assembly has a first radius of curvature.

15. The display assembly of claim 13, further comprising:
a meniscus lens configured to correct optical error caused by the radius of curvature.

16. The display assembly of claim 13, further comprising:
a 1-dimensional Fresnel lens configured to correct optical error caused by the radius of curvature.

17. The display assembly of claim 13, wherein the seam is located at least 35 degrees off center, where center is a direction that corresponds to a gaze direction of the eye of the user looking straight ahead.

18. The display assembly of claim 13, further comprising:
a coupler that incouples the image light from the source assembly to the waveguide; and
at least one decoupler that decouples and directs the image light from the waveguide toward the eyebox over the composite FOV.

19. A method comprising:
emitting a first portion of image light from a primary portion of a waveguide, the primary portion having a first field of view (FOV)), and the first FOV is positioned such that, for a user of the display assembly looking straight head, a foveal FOV of an eye of the user is within the first FOV, the waveguide including the primary portion and a peripheral portion, the primary portion and the peripheral portion of the waveguide coming together in a transition region with a radius of curvature that is greater than a threshold; and emitting a second portion of the image light from the peripheral portion of the waveguide, the peripheral portion canted relative to the primary portion and having a second FOV, the emitted first portion of image light and the emitted second portion of image light creating a composite FOV from the perspective of an eyebox, a seam that corresponds to a portion of the transition region between the first FOV and the second FOV located in a peripheral region of the composite FOV, and the peripheral region positioned such that, for the user looking straight head, the foveal FOV of the eye is outside of the peripheral region.

* * * * *